United States Patent
Amanullah et al.

(10) Patent No.: US 11,549,047 B2
(45) Date of Patent: Jan. 10, 2023

(54) ENGINEERED LOSS CONTROL SLURRY WITH IMPROVED PERFORMANCE

(71) Applicant: SAUDI ARABIAN OIL COMPANY, Dhahran (SA)

(72) Inventors: Md Amanullah, Dhahran (SA); Turki Al-Subaie, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 80 days.

(21) Appl. No.: 16/993,473

(22) Filed: Aug. 14, 2020

(65) Prior Publication Data
US 2022/0049149 A1    Feb. 17, 2022

(51) Int. Cl.
C09K 8/502 (2006.01)
C09K 8/514 (2006.01)
C09K 8/516 (2006.01)
E21B 21/00 (2006.01)

(52) U.S. Cl.
CPC ............. *C09K 8/514* (2013.01); *C09K 8/502* (2013.01); *C09K 8/516* (2013.01); *E21B 21/003* (2013.01); *C09K 2208/08* (2013.01)

(58) Field of Classification Search
None
See application file for complete search history.

(56) References Cited

U.S. PATENT DOCUMENTS

| | | |
|---|---|---|
| 3,078,920 A | 2/1963 | Brink |
| 3,448,800 A | 6/1969 | Parker et al. |
| 3,909,421 A | 9/1975 | Gaddis |
| 10,023,781 B2 | 7/2018 | Amanullah |
| 10,259,982 B2 | 4/2019 | Amanullah |
| 10,336,930 B2 | 7/2019 | Amanullah |
| 10,479,920 B2 | 11/2019 | Amanullah et al. |
| 2002/0147113 A1 | 10/2002 | Green |
| 2009/0029878 A1 | 1/2009 | Bicerano |
| 2013/0296199 A1 | 11/2013 | Ghassemzadeh |
| 2014/0135237 A1 | 5/2014 | Villarreal, Jr. et al. |
| 2015/0292279 A1 | 10/2015 | Wang |

FOREIGN PATENT DOCUMENTS

| | | |
|---|---|---|
| WO | 2014133550 A1 | 9/2014 |
| WO | 2015191055 A1 | 12/2015 |
| WO | 2018005575 A1 | 1/2018 |
| WO | 2018013619 A1 | 1/2018 |
| WO | 2018044612 A1 | 3/2018 |
| WO | 2018089282 A1 | 5/2018 |
| WO | 2018222478 A1 | 12/2018 |

OTHER PUBLICATIONS

International Search Report and Written Opinion of the International Searching Authority issued in corresponding International Application No. PCT/US2020/050853, dated May 12, 2021 (13 pages).

*Primary Examiner* — Charles R Nold
(74) *Attorney, Agent, or Firm* — Osha Bergman Watanabe & Burton LLP

(57) ABSTRACT

Modified Drilling fluid compositions and methods for using drilling fluid compositions are provided with enhanced loss control properties where the modified drilling fluid may include a carrier fluid, one or more drilling fluid additives, and a loss control material blend. The loss control material blend may include a particle component of sized particulate comprising a plurality of a mixture of untreated date seed particles and a fibrous component comprising a mixture of hard date leaflet fibers and soft date tree fibers prepared from date tree waste materials. Methods to control lost circulation in a lost circulation zone in a wellbore may include introducing a modified drilling fluid into the wellbore such that the modified drilling fluid contacts the lost circulation zone.

19 Claims, No Drawings

ENGINEERED LOSS CONTROL SLURRY WITH IMPROVED PERFORMANCE

BACKGROUND

Lost circulation is one of the frequent challenges encountered during drilling operations. As a wellbore is drilled, a drilling fluid is continuously pumped into the wellbore to clear and clean the wellbore and the filings. The drilling fluid is pumped from a mud pit into the wellbore and returns again to the surface. A lost circulation zone may be encountered and diagnosed when the flow rate of the drilling fluid that returns to the surface is less than the flow rate of the drilling fluid pumped into the wellbore. It is this reduction or absence of returning drilling fluid that is referred to as lost circulation.

While some fluid loss is expected, fluid loss beyond acceptable norms is not desirable from a technical, an economical, or an environmental point of view. About 75% of the wells drilled per year encounter lost circulation problems to some extent. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well. In addition, delays in controlling lost circulation can lead to highly complex problems, including the failure to control the lost circulation in any meaningful way.

Lost circulation can be categorized as seepage type, moderate type, severe type, and total loss, referring to the amount of fluid or mud lost. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling. Such formations include narrow mud weight window, low fracture gradient, depleted reservoir pressure, formations with soluble minerals such as halite, evaporate, and anhydrite.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to modified drilling fluids that may include a carrier fluid, one or more drilling fluid additives, and a loss control material blend. The loss control material blend may include a particle component of sized particulate comprising a plurality of a mixture of untreated date seed particles and a fibrous component comprising a mixture of hard date leaflet fibers and soft date tree fibers prepared from date tree waste materials.

In a further aspect, embodiments disclosed herein relate to methods to control lost circulation in a lost circulation zone in a wellbore. The method may include introducing a modified drilling fluid into the wellbore such that the modified drilling fluid contacts the lost circulation zone. The modified drilling fluid may include a carrier fluid, one or more drilling fluid additives, and a loss control material blend. The loss control material blend may include a particle component of sized particulate comprising a plurality of un-treated date seed particles and a fibrous component including a combination of hard date leaflet fibers and soft date tree fibers prepared from date tree waste materials.

In another aspect, embodiments disclosed herein relate to loss control blend compositions including one or more loss control material additives, and a loss control material that may include a particle component of sized particulate comprising a plurality of un-treated date seed particles and a fibrous component comprising a combination of hard date leaflet fibers and soft date tree fibers prepared from date tree waste materials.

Other aspects and advantages of the claimed subject matter will be apparent from the following description and the appended claims.

DETAILED DESCRIPTION

Embodiments in accordance with the present disclosure generally relate to compositions and methods of a loss control modified drilling fluid and a fluid loss control material composition. One or more embodiments relate to compositions and methods that can improve upon the prevention of moderate and severe loss circulation problems encountered in the presence of permeable formations.

Although many loss control materials (LCMs) products, compositions, blends, engineered pills, loss control slurries, and tailored made formulations exist and have been proposed for preventing and mitigating loss of circulation, there is a continuous need of identification and development of novel products, improved compositions of loss control slurry, superior LCM pills and upgraded LCM blends for effective sealing and blocking of loss zones for trouble free and economic drilling operations. In addition to the sealing and blocking performance, the industry needs eco-friendly, highly versatile, better performing, placement friendly LCM pills and blends to fulfill the functional tasks without causing any damage or degradation to the surrounding environments, ecosystems and the habitats.

Loss control materials (LCM) are used to mitigate the lost circulation by blocking the path of the drilling fluid (such as drilling mud) into the formation. The type of LCM used in a lost circulation situation depends on the extent of lost circulation and the type of formation. Different types of LCMs such as particulate, granular, fibrous and flaky materials are frequently used, either alone or in combination, to control loss of circulation. For example, different types of sized particulate lost circulation materials are used to combat loss of circulation either as a background material in the mud system or as a component of an LCM pill or a loss control slurry. The purpose of the particulate material is to assist in creation of an effective and stable seal or plug in the loss zone to maintain the integrity of the seal or plug in changing borehole conditions. One or more embodiments of the present disclosure relates to a LCM blend composition that may be used in an LCM pill or a loss control slurry.

One or more embodiments of the present disclosure relate to an LCM blend composition and modified drilling fluid comprising such composition and methods that may provide improved sealing and blocking capacity for partial loss control for targeted moderate loss zones losing less than 100 barrels (bbls) per hour, where "barrel" refers to a standard oilfield barrel having a volume of 42 U.S. gallons.

The ranges may be expressed in the disclosure as from about one particular value, to about another particular value, or both. When such a range is expressed, it is to be understood that another embodiment is from the one particular value, to the other particular value, or both, along with all combinations within said range.

Loss Control Material Blend Composition

One or more embodiments provided herein may relate to a modified drilling fluid including LCM blend compositions with enhanced loss control properties, a carrier fluid; one or more drilling fluid additives, where the LCM blend composition may comprise one or more LCM components.

In one or more embodiments, the loss control blend composition may include a variety of LCM components with a combination of both particle components of sized particulate comprising a plurality of date seed particles, and fibrous components comprising a combination of hard date leaflet fibers and soft date tree fibers prepared from date tree waste materials. In one or more embodiments, the present LCM blend composition may comprise a combination of "plug" LCM material and "fiber" LCM material. In one or more embodiments of the present disclosure, the LCM blend composition may further comprise additional loss control additives.

In one or more embodiments, the modified drilling fluid may include an LCM blend composition in an amount ranging from 100, 120, 140, 160, 170, 180, 190, and 200 pounds per barrel (ppb) to 160, 180, 190, 200, 220, 240, 260, 280 and 300 ppb, where any lower limit may be combined with any mathematically feasible upper limit.

In one or more embodiments of the present disclosure the modified drilling fluid may include an oil-based carrier fluid or an aqueous based carrier fluid. In one or more embodiments the carrier fluid may include one or more drilling fluid additives such as, wetting agents, organophilic clays, viscosifiers, surfactants, dispersants, interfacial tension reducers or emulsifying agents, rheological modifies, pH buffers, mutual solvents, thinners, thinning agents, weighting agents, and cleaning agents. Drilling fluid additives may be added in tailorable amounts to achieve the specific characteristics of the target fluid profile.

In one or more embodiments of the present disclosure, the modified drilling fluid including the LCM blend composition may be stable and capable of reducing fluid loss in a well formation at temperatures of less than 350° F. and pressures up to 1500 pounds per square inch (PSI). In one or more embodiments, the LCM blend composition may be thermally stable and may not undergo degradation up to temperatures of about 350° F. and pressures up to 1500 PSI. In one or more embodiments, a modified drilling fluid including the LCM blend composition prepared in accordance with one or more embodiments of the present disclosure can be introduced into the wellbore such that the modified drilling fluid contacts the lost circulation zone and results in the reduction of rate of lost circulation into the lost circulation zone. In one or more embodiments, the modified drilling fluid may be introduced into the wellbore such that the modified drilling fluid contacts the lost circulation zone and results in the reduction of rate of lost circulation, where the reduced rate of lost circulation of a fluid portion of the altered drilling fluid is zero.

In one or more embodiments, the LCM blend composition may be added directly to a drilling fluid, such as a drilling mud, to create a modified drilling fluid having the LCM blend composition. In one or more embodiments, the LCM blend composition may be added to a drilling fluid including, oil-based muds (OBMs), such as those including diesel, mineral oil, and synthetic oil, or any other oil based fluid known to one skilled in the art. In one or more embodiments the LCM blend composition may be added to a drilling fluid including aqueous based fluids, such as water-based fluids, salt water and brines, and any other aqueous based drilling fluid known to those skilled in the art. In one or more embodiments, the LCM blend composition may be added to a drilling fluid including emulsion-based fluids and invert emulsion based fluids.

The oleaginous fluid may be any suitable fluid such as oil or a solution containing both oil and one or more organic or inorganic compounds dissolved in the oil or otherwise completely miscible with the oil. The oleaginous fluid may include at least one naturally-derived or synthetically-derived oil. The oleaginous fluid of the invert emulsion fluid may include oils derived from petroleum, such as mineral oils, diesel oils, linear or branched olefins, polyolefins, alkanes, paraffins, esters of fatty acids, straight chain, branched or cyclical alley ethers of fatty acids, other petroleum-derived oils, or combinations of any of these. The oleaginous fluid may contain esters, ethers, acetals, dialkylcarbonates, hydrocarbons, or combinations of any of these. The oleaginous fluid may also include oils derived from animals or plants, such as safra oil, for example. The oleaginous fluid may also include other oils, such as but not limited to poly diorganosiloxanes, siloxanes, organosiloxanes, other silicone-based oils, or combinations of these.

An aqueous based fluid may be any suitable fluid such as water or a solution containing both water and one or more organic or inorganic compounds dissolved in the water or otherwise completely miscible with the water. The aqueous fluid in some embodiments may contain water, including freshwater, well water, filtered water, distilled water, seawater, salt water, produced water, formation brine, other type of water, or combinations of waters. In embodiments, the aqueous fluid may contain brine, including natural and synthetic brine. The aqueous fluid may include water containing water-soluble organic compounds, such as alcohols, organic acids, amines, aldehydes, ketones, esters, or other polar organic compounds for example, or salts dissolved in the water. In some embodiments, the aqueous fluid may include salts, water-soluble organic compounds, or both as impurities dissolved in the water. Alternatively, in embodiments, the aqueous fluid may include salts, water-soluble organic compounds, or both salts and water-soluble organic compounds to modify at least one property of the aqueous fluid, such as the density of the aqueous fluid for example. In some embodiments, increasing the amount of salt, water-soluble organic compounds, or both salt and water-soluble organic compounds in the aqueous fluid may increase the density of the drilling fluid. In some embodiments, salts that may be present in the aqueous fluid may include metal salts such as sodium salts, calcium salts, cesium salts, zinc salts, aluminum salts, magnesium salts, potassium salts, strontium salts, silicates, lithium salts, or combinations of these, for example. The metal salts may be in the form of chlorides, bromides, carbonates, hydroxides, iodides, chlorates, bromates, formates, nitrates, sulfates, phosphates, oxides, fluorides or combinations of these, for example.

Date Seed Plug

One or more embodiments of the present disclosure relates to an LCM blend composition comprising a date seed-based particulate LCM product referred to as an LCM "plug". The date palm seed-based particulate LCM material described in the present disclosure may be chemically inert, physically granular, mechanically strong, biodegradable, environmentally-friendly and non-toxic. In one or more embodiments, the date palm seed-based particulate LCM material may be prepared by drying a plurality of date palm seeds and grinding the plurality of date palm seeds to produce the plurality of untreated particles. Methods may includes blending the plurality of untreated particles into an LCM blend composition and mixing the LCM blend composition into a drilling fluid to create a modified drilling fluid.

As described, the date palm seed LCM may have a plugging efficiency comparable to or better than conventional tree nut based LCMs such as a walnut LCM and thus may have sealing and blocking capacity better than conventional tree nut based LCMs. In some embodiments, the date palm seeds may be obtained from genetically modified date trees (that is, genetically modified organisms (GMOs)). In some embodiments, the date palm seeds may be prepared by cleaning the caps before use as an LCM, such as by blowing air over the seeds to remove dust, dirt, and other materials In some embodiments, the date palm seed particles may include particles having a particle size distribution, as determined by the diameters of the particles passed or retained in mesh openings, of less than about 3400 microns (that is, particles passing through sieve mesh size no. 6) with a particle size that ranges from about 1000 microns to about 1200 microns. In some embodiments, the date palm seed particles may include particles having a particle size distribution that may be referred to as course, medium, fine, or super fine. In one or more embodiments, the particle may be ground or milled to produce a specific particle size that may be tailorable to a specific pore size, fracture size or vug size. For example, smaller grade ranges may be prepared for smaller fractures and larger grade ranges may be prepared for larger fractures.

In one or more embodiments, date palm seed particles may be prepared where the particles may have a diameter ranging from about 800 microns to about 2850 microns. In other embodiments, date palm seed particles may be prepared such that the particles may have a diameter ranging from about 300 microns to about 850 microns. In some embodiments, date palm seed particles may be prepared such that the particles may have a diameter ranging from about 100 microns to about 300 microns. In yet other embodiments, date palm seed particles may be prepared such that the particles may have a diameter ranging from less than about 40 microns to about 110 microns. The date palm seed LCM may also be prepared from a mixture of particles from one or more of the above ranges.

As disclosed, in one or more embodiments, the date palm seed-based particulate LCM material may include untreated date palm seed particles. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the LCM. In accordance with this definition, an LCM that is treated may behave in a manner different than its original starting material. In such embodiments, the date palm seed particles may be manufactured without treating before, during, or after crushing, grinding, drying, or any other processing.

Without being bound by any particular theory, the date seed plug LCM product may improve the performance of the LCM blend composition as a result of the wider particle size distribution profile. This particulate distribution profile provides a more suitable LCM product for larger fractures as well as smaller pore throats and gaps and also as filler materials to seal and block gaps in-between two or more large particles.

The modified drilling fluid composition comprising the LCM blend composition may include the plug date seed-based particulate formulation in an amount that ranges from 5, 10, 15, 20, 25, and 30 ppb to 15, 20, 25, 30, 35, 40, 45, 50, 55, and 60 ppb where any lower limit may be combined with any mathematically feasible upper limit.

In one or more embodiments, the plug LCM may be added directly to a drilling fluid, such as a drilling mud, to create a modified drilling fluid including the mixture of plug LCM. For example, in some embodiments, the engineered plug LCM may be added to (for example, blended with) an oil-based drilling mud or a water-based drilling mud. In some embodiments, the plug LCM may be added at the mud pit of a mud system. After addition of the plug LCM to a drilling fluid, the altered drilling fluid may be circulated at a pump rate effective to position the altered drilling fluid into contact with a lost circulation zone in a wellbore, such that the date palm seed LCM alters the lost circulation zone (for example, by entering and blocking porous and permeable paths, cracks, and fractures in a formation in the lost circulation zone, such as forming a plug in a fracture). In one or more embodiments, the drilling fluid may be an oil based mud including one or more drilling fluid additives.

Date Tree fiber

One or more embodiments of the present disclosure relate to an LCM blend composition comprising a date tree "fiber" mix LCM material formulation that may include date tree trunk fibers produced from date tree trunks, date tree leaf and leaf stem fibers produced from date tree leaves and leaf stems, and date tree panicle fibers produced from date tree panicles. In one or more embodiments the fiber LCM material may include a combination of hard leaflet fibers and soft and ductile trunk fibers that may serve to form and strengthen a woven net that results in more resistance to the flow of fluid. In one or more embodiments, the fiber LCM material component may be prepared by drying a plurality of date tree trunks and grinding the plurality of date tree trunks to produce the fiber mix. Methods may include blending the fiber mix into an LCM blend composition and mixing the LCM blend composition into a drilling fluid to create a modified drilling fluid.

In one or more embodiments, the date tree fiber mix LCM blend composition may include a mix of date tree fibers obtained from date tree waste to mitigate or prevent lost circulation in a well, as well as provide seepage control and minimize or prevent fluid loss. As used in the disclosure, the term date tree waste refers to the waste produced from farming and processing date trees (also referred to as "date palms"), such as in the production of date fruits (also referred to as "dates"). The date tree fiber mix LCM is a fiber mix that includes fibers formed from date tree trunks, fibers formed from date tree leaves and leaf stems, and fibers formed from date tree panicles. As will be appreciated, each date tree panicle may include date tree spikelets, which, in some embodiments, may also be used in the formation of fibers from the date tree panicles. The date tree fiber mix LCM may have a combination of hard leaflet fibers and soft and ductile trunk fibers that form provide for a net-like seal that can be tighter and stronger and ultimately more resistant to the flow of fluid.

In one or more embodiments, the length of the fibers in the LCM fibrous formulation may range from 800 to 1200 microns. In one or more embodiments, the length of the fibers in the LCM fibrous formulation may range from about 100 microns to about 1500 microns. In other embodiments, the length of the fibers in the LCM fibrous formulation may range from about 300 microns to about 850 microns. In some embodiments, the length of the fibers in the LCM fibrous formulation may range from about 100 microns to about 400 microns.

The loss control material composition may include the fiber LCM fibrous formulation in an amount that ranges from 1, 5, 10, 15, 20, 25, and 30 ppb to 15, 20, 25, 30, 35, 40, 45, 50, 55, 60 and 80 ppb where any lower limit may be combined with any mathematically feasible upper limit.

In one or more embodiments, the fiber LCM fibrous formulation may be added directly to a drilling fluid, such as a drilling mud, to create a modified drilling fluid having the fiber LCM fibrous formulation. For example, in some embodiments, the fiber LCM fibrous formulation may be added to (for example, blended with) an oil-based drilling mud. In some embodiments, the fiber LCM fibrous formulation may be added at the mud pit of a mud system. In some embodiments, the fiber LCM fibrous formulation may be added to a drilling fluid in an amount in the range of about 20 parts-per-billion mass (ppb) to about 50 ppb. After addition of the fiber LCM fibrous formulation to a drilling fluid, the altered drilling fluid may be circulated at a pump rate effective to position the altered drilling fluid into contact with a lost circulation zone in a wellbore, such that the fiber LCM fibrous formulation alters the lost circulation zone (for example, by entering and blocking porous and permeable paths, cracks, and fractures in a formation in the lost circulation zone, such as forming a structure (for example, a plug or seal) in a mouth or within a fracture). In one or more embodiments, the drilling fluid may be an oil-based mud including one or more drilling fluid additives.

The eco-friendly, non-toxic, and environmentally friendly properties of the date palm plug and fiber formulation mixture LCMs may minimize or prevent any environmental impact, any effect on ecosystems, habitats, population, crops, and plants surrounding the drilling site where the date palm seed LCM is used.

In one or more embodiments, the plug and fiber mixtures may be added stepwise or simultaneously to a drilling fluid, such as a drilling mud, to create a modified drilling fluid having the plug and fiber LCM fibrous formulation. In one or more embodiments, the drilling fluid may be an oil based mud including one or more drilling fluid additives. In one or more embodiments, the plug and fiber mixtures may be added stepwise or simultaneously to a drilling fluid in combination with additional LCM additives.

In one or more embodiments, the loss control composition may include additional loss control materials including weighting agents, such as calcium carbonate ($CaCO_3$) micro-particles, carbon-based micro-particulate material such as STEELSEAL® (available form Halliburton Energy Services, Inc.), and micro-particulate mica, or a mixture thereof.

In one or more embodiments, the loss control composition of the present disclosure may include a combination of $CaCO_3$ micro-particles.

In some embodiments of the present disclosure, the loss control composition may include $CaCO_3$ with a particle size of about 150 microns in an amount ranging from 30, 32, 35, 37, and 40 ppb to 38, 40, 42, 45, and 50 ppb where any lower limit may be combined with any mathematically feasible upper limit.

In some embodiments of the present disclosure, the loss control composition may include $CaCO_3$ with a particle size of about 600 microns in an amount ranging from 15, 18, 20, 23, and 25 ppb to 23, 25, 28, 30, and 35 ppb where any lower limit may be combined with any mathematically feasible upper limit.

In some embodiments of the present disclosure, the loss control composition may include $CaCO_3$ with a particle size of about 1-3 millimeter (mm) in an amount ranging from 7, 9, 11, 13, and 15 ppb to 13, 15, 17, 20, and 25 ppb where any lower limit may be combined with any mathematically feasible upper limit.

For example, in one or more embodiments, the loss control composition may include a combination of multiple pluralities of $CaCO_3$ with a particle size of 150 microns, 600 microns, and 1-3 mm. One or more embodiments of the present disclosure may include $CaCO_3$ in an amount ranging from 60, 65, 70, 75, and 80 ppb to 70, 75, 80, 85, 90, and 100 ppb where any lower limit may be combined with any mathematically feasible upper limit.

In one or more embodiments, the loss control composition may include carbon-based micro-particulate material such as STEELSEAL® in amount ranging from 20, 22, 25, 28, and 30 ppb to 27, 30, 32, 35, and 40 ppb where any lower limit may be combined with any mathematically feasible upper limit.

In one or more embodiments, the loss control composition may include micro-particulate material such as mica, having a particle diameter of up to 1000 microns, in amount ranging from 10, 13, 15, 18, and 20 ppb to 17, 20, 23, 25, and 30 ppb where any lower limit may be combined with any mathematically feasible upper limit.

EXAMPLES

The following examples are merely illustrative and should not be interpreted as limiting the scope of the present disclosure.

To demonstrate the advantages of the loss control material composition according to one or more embodiments disclosed, the following experiments were conducted to examine the effects of the loss control material composition and to compare the loss control composition according to one or more embodiments of the present disclosure with loss control material that is conventional in the art.

To compare the physical and rheological properties of a drilling fluid containing the loss control composition, according to one or more embodiments of the present disclosure, with those of a drilling fluid containing an industry standard loss control material, the two drilling fluids were prepared. Oil-based mud drilling fluid compositions were prepared based on M-I SWACO RHELIANT™ system that includes a blend of proprietary emulsifiers, wetting agents, and fluid-loss control agents specially tailored for oil-based fluid formulations. Specifically, the drilling fluid carrier was prepared as described herein and as shown in Table 1.

Example 1, directed to a loss control composition prepared in accordance with one or more embodiments of the present disclosure, and Comparative Example 2, directed to an industry standard loss control material, were prepared and added to the OBM drilling fluids comprising: Saraline 185V, a synthetic oil drilling base fluid, available from Shell; SUREMUL®, an amidoamine surfactant, available from M-I SWACO, LLC (Houston, Tx., USA); SUREWET®, a wetting agent, available from M-I SWACO, LLC (Houston, Tx., USA); Lime, an alkalinity source/modifier; VG SUPREME™, a specially formulated organophillic clay, available from M-I SWACO, LLC (Houston, Tx., USA); VG PLUS™, a specially formulated organophillic clay and effective viscosifier in mineral oil and synthetic based drilling fluids, available from M-I SWACO, LLC (Houston, Tx., USA); ECOTROL™ RD, a fluid loss control additive designed for use in oil and synthetic-base drilling fluid systems, available from M-I SWACO, LLC (Houston, Tx., USA); RHETHIK® is a viscosifier and rheology modifier, available from M-I LLC (Houston, Tx.).

Table 1 shows the composition of the OBM system that has been used as the LCM carrier fluid of the modified drilling fluid comprising the loss control material composition. As the components of the LCM blend composition were added to a field OBM system, which has some drilling solids in the system, a field mud sample was selected to be the best representation of the carrier fluid. The field mud was prepared in accordance with one or more embodiments of the present disclosure to conduct tests using the LCM blend compositions of Example 1 and Comparative Example 2. The field formulation OBM was used to benchmark the performance of the designed LCM blend composition with respect to its conventional counterpart's performance. Identical mixing, testing procedures, and conditions were used to prepare and test the designed LCM blend composition of Example 1 with the standard industry LCM blend of Comparative Example 2 to avoid any test artifacts and to adequately compare the results of the designed LCM blend compositions.

TABLE 1

| Mud System Composition | | |
|---|---|---|
| Components | Amount (ppb) | Function |
| SUREMUL | 10 | Primary Emulsifier |
| SUREWET | 2 | Wetting agent |
| LIME | 5 | Alkalinity source |
| VG PLUS | 1.2 | Viscosifier |
| VG SUPREME | 1.2 | Viscosifier/anti-sagging agent |
| ECOTROL | 4 | HTHP fluid loss |
| RHETHINK | 0.5 | Low End Rheology modifier |

Table 2 further provides the properties of the resulting Mud system detailed in Table 1.

TABLE 2

| Mud system Properties | |
|---|---|
| Synthetic base Mud Properties | Values |
| Mud-weight (pcf) | 100 |
| Funnel viscosity | 66 |
| Plastic viscosity (cp) | 34 |
| Yield point (YP) (lbs/100 ft$^2$) | 16 |
| Electrical stability Value | 644 |
| Low-shear-YP (lbs/100 ft$^2$) | 5 |

Composition of Engineered Loss Control Composition

Table 3 shows the composition of the newly engineered LCM blend composition that has been formulated, and added to the mid system as detailed in Tables 1 and 2. The LCM blend composition was prepared in accordance with one or more embodiments of the present disclosure, for effective sealing and blocking of subsalt loss zones. The loss control slurry, prepared in accordance with one or more embodiments of the present disclosure, coined "LCM blend composition", demonstrates that a wide variation in the morphological characteristics of the LCM products can be beneficially employed in the pill design to maximize the sealing and plugging of subsalt rubble zones and to prevent or control the loss of mud into the subsalt loss zones. The presence of particulate LCMs in a varied particle size distribution with flake sizes of variable flake dimension and fibrous LCMs of various aspect ratios, which can serve to provide high suitability for sealing and plugging loss zones of variable pore sizes, gap dimensions, and permeable channels.

Table 4 further demonstrates the formulation of a conventional or standard LCM pill, hereinafter referred to as "Comparative Example 2" used by in the industry to control partial loss of circulation. The composition of Comparative Example 2 is prepared in similar fashion to the composition of Example 1, with the plug and fiber C components replaced with a combination of commercially available fibrous cellulose material including Barofibre® M (manufactured by The Halliburton Company of Houston, Tx., USA), Barofibre® C (manufactured by The Halliburton Company of Houston, Tx., USA), and tree nut based LCMs such as a walnut LCM conventional, termed "nut plug." The conventional LCM blend composition of Comparative Example 2 is used for comparative evaluation of the sealing and plugging performance of the designed LCM blend composition of Example 1, as it is widely used to control partial loss of circulation.

TABLE 3

| LCM Blend Composition with Improved Performance-Example 1 | | |
|---|---|---|
| LCM Component | Specs | Concentration |
| Mud | Rheliant | 350 cc |
| CaCO$_3$ M | 150 microns | 40 ppb |
| CaCO$_3$ C | 600 microns | 25 ppb |
| CaCO$_3$ Chips | 1-3 millimeters (mm) | 15 ppb |
| Steelseal 400 | 400 microns | 30 ppb |
| Date Seed Plug | 1000-1200 microns | 25 ppb |
| Date Tree fiber | 800-1200 microns | 25 ppb |
| Mica C | up to 1000 microns | 20 ppb |
| Total Concentration | | 180 ppb |

TABLE 4

| Conventional LCM-Comparative Example 2 | | |
|---|---|---|
| LCM Component | Specs | Concentration |
| Mud | Rheliant | 350 cc |
| CaCO$_3$ M | 150 microns | 40 ppb |
| CaCO$_3$ C | 600 microns | 25 ppb |
| CaCO$_3$ Chips | 1-3 mm | 15 ppb |
| Steelseal 400 | 400 microns | 30 ppb |
| Nut plug | Medium | 25 ppb |
| Barofiber-M | Medium | 25 ppb |
| Barofiber-C | Coarse | 25 ppb |
| Mica C | up to 1000 microns | 20 ppb |
| Total Concentration | | 200 ppb |

Testing and Evaluation Apparatus

An apparatus was constructed to conduct a physical simulation of a loss zone containing up to 8.5 mm fractures, voids, gaps and permeable channel sizes. Slotted discs with various slot sizes were used to simulate various loss zones. Additionally, 5 mm and 8.5 mm slotted discs were also employed in the experiments.

The complete set up included a 5 or 8.5 mm fracture simulating slotted disc, a bottom lid containing a 10 mm exit hole, a see-through test cell to make visual observation and conduct data recording while testing. The set up further included a modified API stand to fix the test cell assembly properly to maintain stability while testing, and a top lid with an air passage and pressure line connected to apply 100 pounds per square inch (psi) pressure on the slurry top of the test cell during a test run. A flexible tube connected to the exit hole of the bottom lid was fixed and connected to a collection tank to collect any loss control slurry that escaped through the simulated fractures while testing the slurry/pill.

Experimental Procedure

For testing the modified drilling fluid formulation and loss control material composition, about 700 cc of loss control slurry is used for each test. Firstly, the bottom lid was fixed to the lower end of the see-through test cell that contains 5 or 8.5 mm fracture simulating slotted disc. Before pouring the loss control slurry into the test cell, the flexible tube connected to the exit hole was blocked by a blunt face clip to prevent any loss of slurry while pouring into the test cell. Then the test cell is placed into the modified API test frame, and the top lid with the pressure line is connected and fixed properly to prevent any leaking of pressure while testing.

Slurry Column Effect Evaluation: After mounting the test cell, the blunt face clip used to close the flexible pipe was removed to evaluate any loss of fluid under the slurry column effect. The drop in slurry level, and time to drop were recorded.

Overbalance Pressure Effect (OPE): The OPE was measured when the slurry top become static after the slurry column effect test. 100 psi pressure was applied to the top of the loss control slurry to evaluate the sealing and blocking efficiency. Any drop in slurry level, time to drop, and qualitative rate of loss of slurry were recoded to compare and predict the relative performance of the LCM of Example 1 and Comparative Example 2 LCM blend composition. The test provides no guarantee of success of a loss control slurry in the field. However, it can provide relative ranking and the probability and likelihood of success of various LCM products, pills, loss control slurries, and single sack systems, which may provide useful guidelines to select the superior and reject the inferior.

Results

Table 5 shows the qualitative observations recorded during the sealing and blocking tests conducted using the LCM blend compositions to prevent or control severe loss circulation problem encountered in the subsalt loss zone. The tabular data shows the initial height of the loss control slurry before opening the exit hole that allows the escape of loss control slurry.

Table 5 further contains experimental data recorded during sealing and blocking test using the LCM blend composition slurries. Table 5 further provides evidence that the inclusion of the locally developed LCM products (plug and fiber component) in the modified drilling fluid improve the sealing and blocking efficiency of the modified drilling fluid.

The data indicates an initial slurry column height equal to about 190 mm (see Table 4). Measurements show no drop in slurry height after opening the exit hole in the presence 8.5 mm slotted disc and thus indicates no loss of slurry under the fluid column effect. The photo taken after the second squeeze test clearly shows zero height in the test cell due to the loss of all slurry through the 8.5 mm slots representing a severe loss zone (see Table 5). The test data further indicates the inability of the common standard LCM material (Comparative Example 2) to seal and block the 5 and 8.5 mm slotted disc even after the second squeeze test. Hence, it can be concluded that the common standard LCM would be ineffective and unsuccessful in sealing and blocking loss zones with similar sized fractures, voids, vugs, gaps and permeable channels.

Table 5 shows the recorded results of observations and qualitative information acquired during sealing and blocking tests conducted using the designed LCM blend composition of Example 1, to prevent or control a severe loss circulation problem. Recorded observations and tabular data show that the initial height of the loss control slurry was about 190 mm before opening the exit hole that allows the escape of loss control slurry. The qualitative information given in Table 4 indicates no drop in slurry height after opening the exit hole in the presence 8.5 mm slotted disc and thus indicates no loss of slurry under the fluid column effect for the modified drilling fluid comprising the LCM blend composition of Example 1. Qualitative observation further showed that after the second squeeze test, a slight drop of the height of loss control slurry in the test cell was observed due to the loss of some slurry through the 8.5 mm slots representing a severe loss zone (see Table 5). The test data indicates that the ability of the modified drilling fluid comprising the LCM blend composition in Example 1 to seal and block the 8.5 mm slotted disc after the second squeeze test. Hence, it can be concluded that the modified drilling fluid comprising the LCM blend composition in Example 1 provides a successful sealing and blocking of loss zones with similar sized fractures, voids, vugs, gaps and permeable channels.

The incorporation of the locally developed date palm waste-based particulate LCM Plug and the fibrous LCM fiber C in place of the equivalent commercial products used in the field (Barofibre M and C with added Nut plug) results in improved performance of the loss control composition and the modified drilling fluid comprising the loss control composition. Hence, it can be concluded that the loss control composition demonstrated better performance due to the superior performance of the locally developed date palm waste-based LCM products.

| | | Results of Comparative Studies | | | |
| --- | --- | --- | --- | --- | --- |
| | | Field Used LCS | | ARC Designed LCS | |
| Applied Pressure | Measured Parameters | 5 mm Slotted Disc | 8.5 mm Slotted Disc | 5 mm Slotted Disc | 8.5 mm Slotted Disc |
| No Pressure | Initial Slurry Height (mm) | 190 | 190 | 190 | 190 |
| | Slurry Level Drop (mm) | 0 | 0 | 0 | 0 |
| | Time to Drop (mm) | NA | NA | NA | NA |
| 100 psi | Pressure Holding Time (min) | NA | NA | Hold until the test completed | Hold until the 2nd test completed |
| | Slurry Level Drop (mm) | Total Drop | Total Drop both in 1st and 2nd | Negligible Drop | Total Drop in 1st Test and Negligible Drop |

| | | Results of Comparative Studies | | | |
|---|---|---|---|---|---|
| | | Field Used LCS | | ARC Designed LCS | |
| Applied Pressure | Measured Parameters | 5 mm Slotted Disc | 8.5 mm Slotted Disc | 5 mm Slotted Disc | 8.5 mm Slotted Disc |
| | Time to Drop (min) | Nearly Immediate | Tests Immediate | Few seconds | in 2nd Test . . . |

Although the preceding description has been made herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A modified drilling fluid comprising:
   a carrier fluid;
   one or more drilling fluid additives; and
   a loss control material blend comprising:
   a particle component of sized particulate comprising a mixture of untreated date seed particles, wherein each particle in the mixture of untreated date seed particles has a diameter from 1000 to 1200 microns;
   and a fibrous component comprising a mixture of hard date leaflet fibers and soft date tree fibers prepared from date tree waste materials, wherein each fiber of the mixture of hard date leaflet fibers and soft date tree fibers has a length from 800 to 1200 microns,
   wherein the loss control material is able to seal and block openings having a size of up to 5 mm.

2. The modified drilling fluid of claim 1, further comprising one or more loss control additive materials.

3. The modified drilling fluid of claim 2, wherein the one or more loss control additives is selected from a group consisting of calcium carbonate, mica, a carbon based particulate material, or a combination thereof.

4. The modified drilling fluid of claim 1, wherein the loss control material blend is comprised in an amount ranging from 180 to 200 ppb, with respect to the modified drilling fluid.

5. The modified drilling fluid of claim 1, wherein the mixture of untreated date seed particles are comprised in an amount ranging from 20 to 50 ppb, with respect to the modified drilling fluid.

6. The modified drilling fluid of claim 1, wherein the loss control composition comprises the mixture of hard date leaflet fibers and soft date tree fibers in an amount ranging from 20 to 50 ppb, with respect to the modified drilling fluid.

7. The modified drilling fluid of claim 1, wherein the carrier fluid is selected from the group consisting of an aqueous based carrier fluid and an oil based carrier fluid.

8. The modified drilling fluid of claim 1, wherein the modified drilling fluid comprises 180 to 200 ppb of the loss control material blend, with respect to the modified drilling fluid, wherein the loss control material blend comprises the mixture of untreated date seed particles in an amount of 20 to 50 ppb, with respect to the modified drilling fluid, and the mixture of hard date leaflet fibers and soft date tree fibers prepared from date tree waste materials in an amount of 20 to 50 ppb, with respect to the modified drilling fluid.

9. The modified drilling fluid of claim 1, wherein the loss control material is able to seal and block openings having a size of up to 8.5 mm.

10. A method to control lost circulation in a lost circulation zone in a wellbore comprising:
    introducing a modified drilling fluid into the wellbore such that the modified drilling fluid contacts the lost circulation zone, wherein the modified drilling fluid comprises a carrier fluid, one or more drilling fluid additives, and a loss control material blend comprising a particle component of sized particulate comprising a plurality of untreated date seed particles, wherein each particle in the plurality of untreated date seed particles has a diameter from 1000 to 1200 microns, and a fibrous component comprising a combination of hard date leaflet fibers and soft date tree fibers prepared from date tree waste materials, wherein each fiber from the combination of hard date leaflet fibers and soft date tree fibers has a length from 800 to 1200 microns; and
    sealing and blocking openings having a size of up to 5 mm in the loss circulation zone with the modified drilling fluid.

11. The method of claim 10, wherein the introducing of the modified drilling fluid into the wellbore such that the modified drilling fluid contacts the lost circulation zone reduces a rate of lost circulation into the lost circulation zone.

12. The method of claim 11, wherein the reduced rate of lost circulation of a fluid portion of the altered drilling fluid is zero.

13. The method of claim 10, wherein the modified drilling fluid comprises one or more loss control additive materials.

14. The method of claim 10, wherein the modified drilling fluid comprises the loss control material blend in an amount ranging from 180 to 200 ppb.

15. The method of claim 10, wherein the plurality of untreated date seed particles is comprised in an amount ranging from 20 to 50 ppb, with respect to the modified drilling fluid.

16. The method of claim 10, wherein the mixture of hard date leaflet fibers and soft date tree fibers are comprised in an amount ranging from 20 to 50 ppb, with respect to the modified drilling fluid.

17. The method of claim 10, wherein the modified drilling fluid is stable at temperatures up to 350° F.

18. A loss control blend composition that is able to seal and block openings having a size up to 5 mm comprising:
   one or more loss control material additives; and
   a loss control material comprising a particle component of sized particulate comprising a plurality of un-treated date seed particles wherein each particle in the plurality of untreated date seed particles has a diameter from 1000 to 1200 microns and a fibrous component comprising a combination of hard date leaflet fibers and soft date tree fibers prepared from date tree waste materials wherein each fiber from the combination of hard date leaflet fibers and soft date tree fibers has a length from 800 to 1200 microns.

19. The loss control composition of claim 18, wherein the one or more loss control additives is selected from a group consisting of calcium carbonate, mica, and a carbon based particulate material, or a mixture thereof.

* * * * *